United States Patent
Aiyoshi et al.

(10) Patent No.: US 9,361,487 B2
(45) Date of Patent: Jun. 7, 2016

(54) CARD READER

(71) Applicant: NIDEC SANKYO CORPORATION, Suwa-gun, Nagano (JP)

(72) Inventors: Hiroyuki Aiyoshi, Nagano (JP); Toshio Tatai, Nagano (JP); Takeki Watanabe, Nagano (JP)

(73) Assignee: NIDEC SANKYO CORPORATION (JP)

( * ) Notice: Subject to any disclaimer, the term of this patent is extended or adjusted under 35 U.S.C. 154(b) by 0 days.

(21) Appl. No.: 14/928,316

(22) Filed: Oct. 30, 2015

(65) Prior Publication Data

US 2016/0125207 A1    May 5, 2016

(30) Foreign Application Priority Data

Oct. 30, 2014   (JP) .................................. 2014-221542

(51) Int. Cl.
*G06K 7/14* (2006.01)
*G06K 7/00* (2006.01)
*G06K 7/08* (2006.01)

(52) U.S. Cl.
CPC .............. *G06K 7/0004* (2013.01); *G06K 7/003* (2013.01); *G06K 7/084* (2013.01)

(58) Field of Classification Search
USPC .................................... 235/440, 475; 439/327
See application file for complete search history.

(56) References Cited

U.S. PATENT DOCUMENTS

| 8,251,293 B2 * | 8/2012 | Nagata | G06K 13/08 235/475 |
|---|---|---|---|
| 2008/0185442 A1 * | 8/2008 | Nagata | G06K 13/0875 235/475 |
| 2015/0340780 A1 * | 11/2015 | Pavageau | G06K 7/0073 439/327 |

FOREIGN PATENT DOCUMENTS

JP    2010026826 A    2/2010

* cited by examiner

*Primary Examiner* — Allyson Trail
(74) *Attorney, Agent, or Firm* — Cantor Colburn LLP (57) ABSTRACT

A card reader may include a card passage, a magnetic head to abut with a magnetic stripe of the card, and an IC contact block having IC contact springs to contact with external connection terminals of an IC chip of the card. The magnetic head is disposed in a front side portion of the card reader so that a gap of the magnetic head faces the card passage from a lower side, and the IC contact block is disposed in a rear side portion of the card reader so that the IC contact springs face the card passage from an upper side. The card passage is formed in a straight shape but is inclined to a lower side as going to the rear side.

12 Claims, 4 Drawing Sheets

CARD READER

CROSS REFERENCE TO RELATED APPLICATION

The present invention claims priority under 35 U.S.C. §119 to Japanese Application No. 2014-221542 filed Oct. 30, 2014, the entire content of which is incorporated herein by reference.

FIELD OF THE INVENTION

At least an embodiment of the present invention may relate to a card reader structured to read data recorded in a card and/or to record data to a card.

BACKGROUND

Conventionally, a card reader has been known in which a card is manually operated to read data recorded in the card and record data to the card (see, for example, Japanese Patent Laid-Open No. 2010-26826). The card reader described in the Patent Literature is formed in a flat and substantially rectangular parallelepiped shape. The card reader is formed with a card passage where a card inserted into a card insertion port is passed. Further, the card reader includes a magnetic head structured to abut with a magnetic stripe formed on one face of a card, a plurality of IC contact springs structured to contact with external connection terminals of an IC chip formed on the other face of the card, a contact spring holding member attached with a plurality of the IC contact springs, and a tension coil spring which urges the contact spring holding member. The magnetic head is disposed in a front end side portion of the card reader where the card insertion port is formed and the IC contact springs and the contact spring holding member are disposed in a rear end side portion of the card reader.

The card reader described in the above-mentioned Patent Literature is formed in a flat and substantially rectangular parallelepiped shape and the thickness of the card reader is thin. On the other hand, in the market, the card reader is required to be further thinner. In a case of the card reader described in the above-mentioned Patent Literature, if the magnetic head, the contact spring holding member, the tension coil spring and the like are made thinner, the card reader can be made further thinner. However, in the card reader described in the above-mentioned Patent Literature, when these structural components are made thinner, followability of the magnetic head for a deformed card, a contact pressure of the magnetic head with a card and a contact pressure of the IC contact springs with a card are varied and, as a result, reading accuracy and recording accuracy of data by the magnetic head and the IC contact springs may be lowered. In other words, when the magnetic head, the contact spring holding member and the like are made thinner in order to make the card reader described in the above-mentioned Patent Literature further thinner, reliability of the card reader may be lowered.

SUMMARY

In view of the problem described above, at least an embodiment of the present invention may advantageously provide a card reader including an IC contact block having a plurality of IC contact springs and a magnetic head, the card reader being capable of reducing its thickness while securing conventionally similar reliability.

According to at least an embodiment of the present invention, there may be provided a card reader structured to perform at least one of reading of data recorded in a card and recording of data to the card. The card reader includes a card passage where a card is passed, a magnetic head structured to abut with a magnetic stripe formed on one face of the card, and an IC contact block having a plurality of IC contact springs structured to contact with external connection terminals of an IC chip formed on the other face of the card. When a side of the card reader where an insertion port for a card is formed is referred to as a front side and its opposite side is referred to as a rear side, and one side in a thickness direction of the card passing the card passage is referred to as a first direction side and its opposite side is referred to as a second direction side, the magnetic head is disposed in the front side portion of the card reader so that a gap of the magnetic head faces the card passage from the first direction side, and the IC contact block is disposed in the rear side portion of the card reader so that the IC contact springs face the card passage from the second direction side. A portion on the first direction side of the card reader relative to the card passage becomes gradually larger to the first direction side as going to the front side and a portion on the second direction side of the card reader relative to the card passage becomes gradually larger to the second direction side as going to the rear side.

In the card reader in at least an embodiment of the present invention, the magnetic head is disposed in the front side portion of the card reader so that a gap of the magnetic head faces the card passage from the first direction side, and the IC contact block is disposed in the rear side portion of the card reader so that the IC contact springs face the card passage from the second direction side. Further, in at least an embodiment of the present invention, a portion on the first direction side of the card reader relative to the card passage becomes gradually larger to the first direction side as going to the front side and a portion on the second direction side of the card reader relative to the card passage becomes gradually larger to the second direction side as going to the rear side. Therefore, according to at least an embodiment of the present invention, even when the card reader is made thinner, the front side portion of the card reader where the magnetic head is disposed can be made thicker on the first direction side relative to the card passage, and the rear side portion of the card reader where the IC contact block is disposed can be made thicker on the second direction side relative to the card passage. Accordingly, in at least an embodiment of the present invention, even when the card reader is made thinner, the magnetic head, the IC contact block and the like having been conventionally used are capable of being disposed. As a result, according to at least an embodiment of the present invention, while securing conventionally similar reliability of the card reader, the card reader can be made further thinner than the conventional one. Further, in at least an embodiment of the present invention, even when the card reader is made thinner, the magnetic head, the IC contact block and the like having been conventionally used are capable of being disposed and thus man-hours for designing the card reader in order to make the card reader thinner can be reduced.

Further, according to at least an embodiment of the present invention, there may be provided a card reader structured to perform at least one of reading of data recorded in a card and recording of data to the card. The card reader includes a card passage where a card is passed, an attaching reference face which is a reference surface for attaching the card reader to a host device on which the card reader is to be mounted, a magnetic head structured to abut with a magnetic stripe formed on one face of the card, and an IC contact block having a plurality of IC contact springs structured to contact with external connection terminals of an IC chip formed on the other face of the card. When a side of the card reader where an insertion port for a card is formed is referred to as a front side and its opposite side is referred to as a rear side, and one side in a thickness direction of the card passing the card passage is referred to as a first direction side and its opposite side is referred to as a second direction side, the magnetic head is disposed in the front side portion of the card reader so that a gap of the magnetic head faces the card passage from the first direction side, and the IC contact block is disposed in the rear side portion of the card reader so that the IC contact springs face the card passage from the second direction side. When viewed in a width direction of the card passing the card passage, the card passage is inclined to the first direction side with respect to the attaching reference face as going to the rear side.

In the card reader in at least an embodiment of the present invention, the magnetic head is disposed in the front side portion of the card reader so that a gap of the magnetic head faces the card passage from the first direction side, and the IC contact block is disposed in the rear side portion of the card reader so that the IC contact springs face the card passage from the second direction side. Further, in at least an embodiment of the present invention, when viewed in a width direction of the card passing the card passage, the card passage is inclined to the first direction side with respect to the attaching reference face as going to the rear side. Therefore, according to at least an embodiment of the present invention, even when the card reader is made thinner, a front side portion of the card reader where the magnetic head is disposed can be made thicker on the first direction side relative to the card passage, and a rear side portion of the card reader where the IC contact block is disposed can be made thicker on the second direction side relative to the card passage. Accordingly, in at least an embodiment of the present invention, even when the card reader is made thinner, the magnetic head, the IC contact block and the like having been conventionally used are capable of being disposed. As a result, according to at least an embodiment of the present invention, while securing conventionally similar reliability of the card reader, the card reader can be made further thinner than the conventional one. Further, in at least an embodiment of the present invention, even when the card reader is made thinner, the magnetic head, the IC contact block and the like having been conventionally used are capable of being disposed and thus man-hours for designing the card reader in order to make the card reader thinner can be reduced.

In at least an embodiment of the present invention, the card reader includes a fixed frame made of a metal thin plate for fixing the card reader to the host device, the fixed frame is provided with an orthogonal flat part in a flat plate shape which is perpendicular to the width direction of the card passing the card passage, and the orthogonal flat part is formed with a screw hole for fixing the card reader to the host device. According to this structure, the orthogonal flat part can be disposed in a side face of the card reader in a card width direction and thus, even when the card reader is capable of being mounted on a host device, the card reader can be made thinner. In this case, for example, the card reader includes a frame which is formed with the card passage in its inside, the fixed frame is provided with a flat plate part having the attaching reference face on one side in the thickness direction of the card passing the card passage and two orthogonal flat parts on both sides of the flat plate part, a circuit board on which a control circuit for the card reader is mounted is provided between the frame and the flat plate part of the fixed frame, and the card passage is inclined by the same angle with respect to the circuit board as an angle of inclination of the card passage with respect to the attaching reference face.

In at least an embodiment of the present invention, the IC contact block is connected with the frame through a parallel link mechanism, the parallel link mechanism includes turning arms which are parallel to each other and are turnably supported by a support shaft at two positions in a card passing direction when viewed in the width direction of the card passing the card passage, and a straight line connecting two support shafts (shaft centers) provided in the card passing direction is inclined by the same angle with respect to the attaching reference face as the angle of inclination of the card passage with respect to the attaching reference face. According to this structure, a plurality of IC contact springs provided in the IC contact block can be appropriately contacted with the external connection terminals of an IC chip formed on a card in the card passage which is inclined.

In at least an embodiment of the present invention, the first direction side is an opposite side to the circuit board with respect to the card passage, and the second direction side is a side of the circuit board with respect to the card passage. Alternatively, the first direction side is an opposite side to the attaching reference face with respect to the card passage, and the second direction side is a side of the attaching reference face with respect to the card passage. In these cases, the IC contact block which requires a moving space and its moving mechanism is disposed on the side where the circuit board or the attaching reference face is disposed. Therefore, when the shapes of the circuit board and the attaching reference face are determined in consideration of arrangement of the IC contact block, the card reader can be made further thinner.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

An embodiment of the present invention will be described below with reference to the accompanying drawings.

(Structure of Card Reader)

Figure 1:
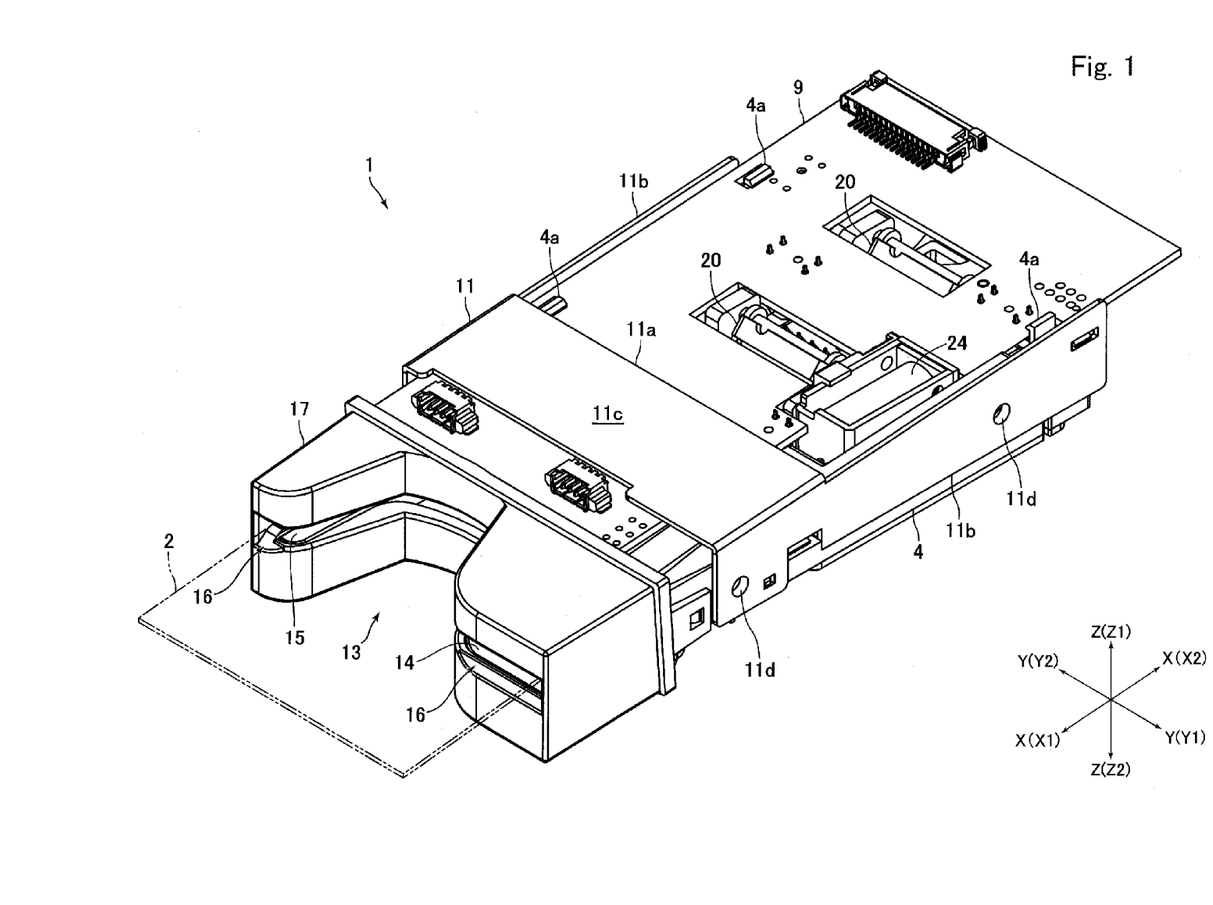
FIG. 1 is a perspective view showing a card reader in accordance with an embodiment of the present invention.
Figure 2:
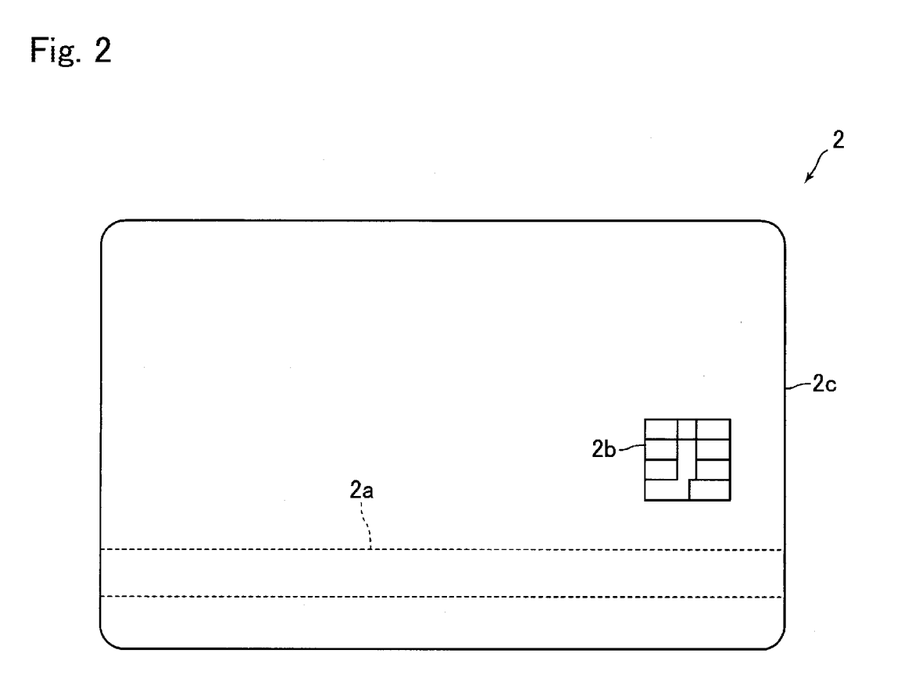
FIG. 2 is a plan view showing a card in FIG. 1.
Figure 3:
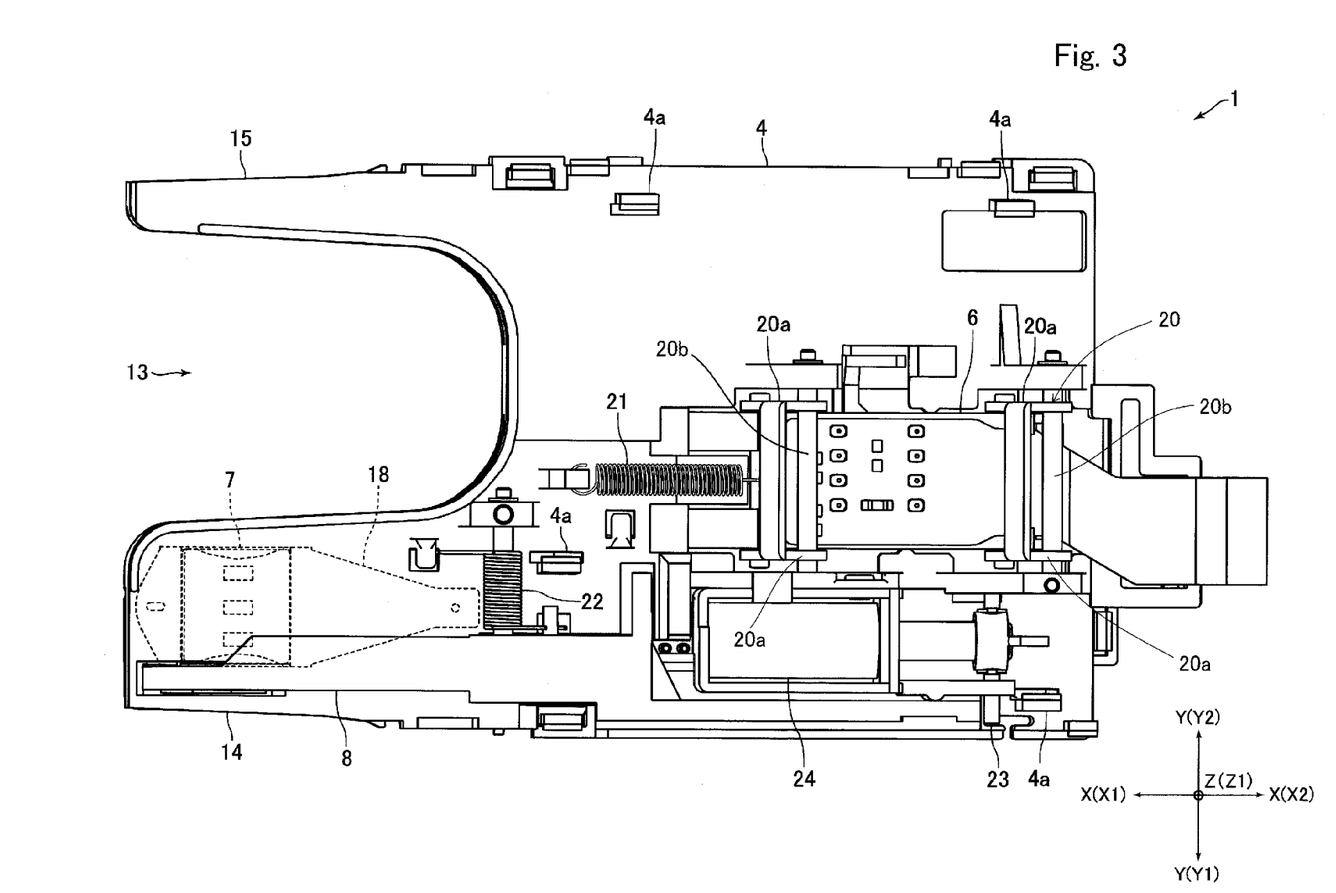
FIG. 3 is a plan view showing the card reader in FIG. 1 from which a circuit board, a fixed frame and a front face cover are detached.
Figure 4:
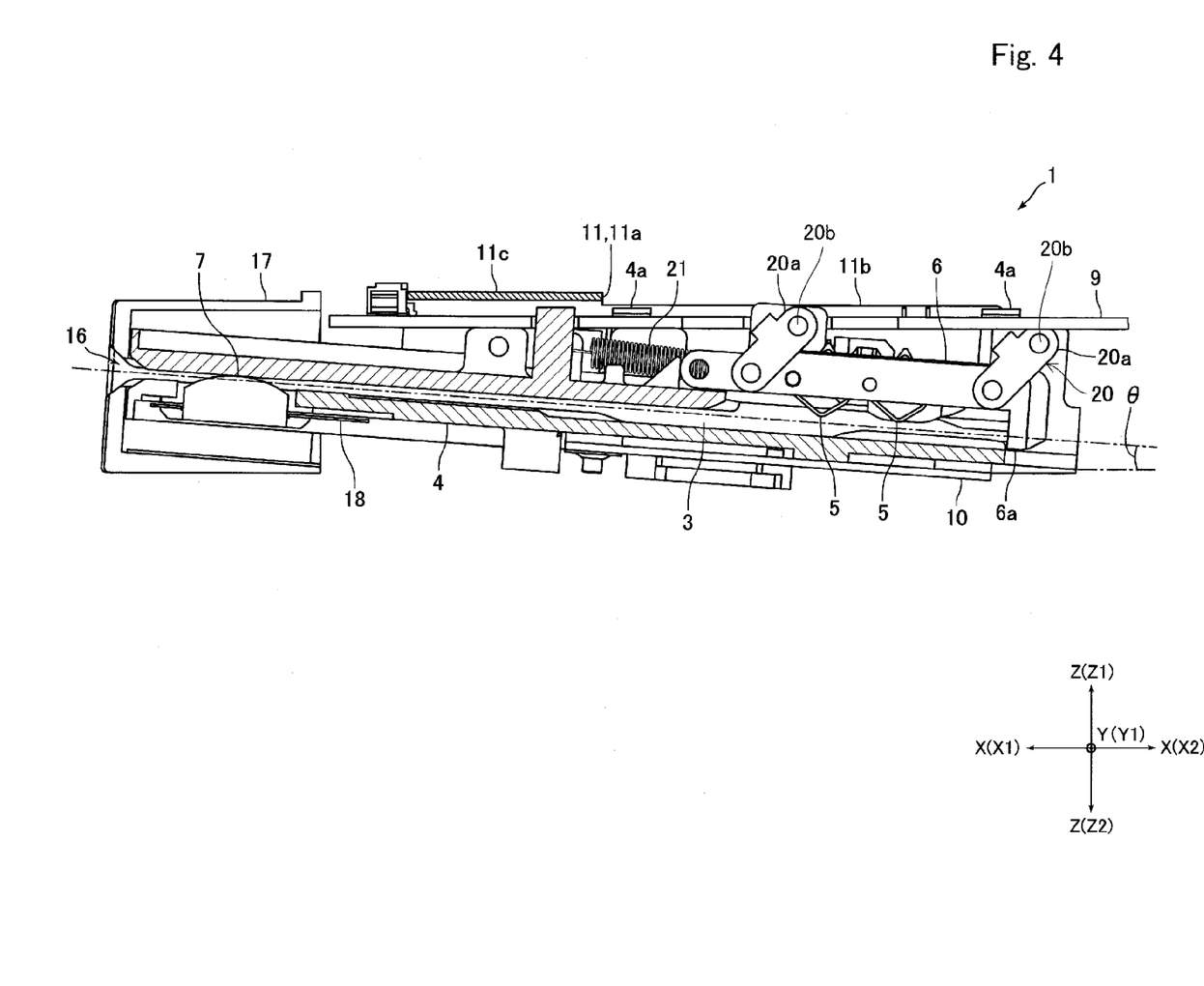
FIG. 4 is an explanatory cross-sectional view showing an internal structure of the card reader shown in FIG. 1.

FIG. 1 is a perspective view showing a card reader 1 in accordance with an embodiment of the present invention. FIG. 2 is a plan view showing a card 2 in FIG. 1. FIG. 3 is a plan view showing the card reader 1 in FIG. 1 from which a circuit board 9, a fixed frame 11 and a front face cover 17 are detached. FIG. 4 is an explanatory cross-sectional view showing an internal structure of the card reader 1 shown in FIG. 1.

A card reader 1 in this embodiment is a device in which a card 2 is manually operated by a user and at least one of reading of data recorded in a card 2 and recording of data to a card 2 is performed. The card reader 1 is mounted on a predetermined host device (not shown) and used. The card reader 1 is formed in a flat and substantially rectangular parallelepiped shape. As shown in FIG. 4, the card reader 1 is formed with a card passage 3 where a card 2 is passed. The card reader 1 includes a frame 4 which is formed with a card passage 3 in its inside, an IC contact block 6 having a plurality of IC contact springs 5, and a magnetic head 7. Further, the card reader 1 includes a lever member 8 structured to prevent drawing-out of the card 2 inserted into its inside, two circuit boards 9 and 10 on which various electronic components and the like are mounted, and a fixed frame 11 for fixing the card reader 1 to a host device on which the card reader 1 is mounted.

In this embodiment, a card 2 is passed in an "X" direction shown in FIG. 1 and the like. In other words, the "X" direction is a passing direction of a card 2 passing the card passage 3. Further, the "Z" direction in FIG. 1 and the like perpendicular to the "X" direction is a thickness direction of a card 2 passing the card passage 3, and the "Y" direction in FIG. 1 and the like perpendicular to the "X" direction and the "Z" direction is a width direction of the card 2 passing the card passage 3. In the following descriptions, the "X" direction is referred to as a "front and rear direction", the "Y" direction is referred to as a "right and left" direction, and the "Z" direction is as an "upper and lower direction". Further, the "X1" direction side is referred to as a "front" side, the "X2" direction side is as a "back (rear)" side, the "Y1" direction side is as a "right" side, the "Y2" direction side is as a "left" side, the "Z1" direction side is an "upper" side, and the "Z2" direction side is as a "lower" side. In this embodiment, a lower side ("Z2" direction side) is a first direction side which is one side in a thickness direction of a card 2, and an upper side ("Z1" direction side) is a second direction side which is the other side in the thickness direction of the card 2. Further, the card reader 1 in this embodiment is formed in a flat and substantially rectangular parallelepiped shape whose thickness in the upper and lower direction is thin.

A card 2 is a substantially rectangular-shaped card made of vinyl chloride whose thickness is about 0.7-0.8 mm. As shown in FIG. 2, a magnetic stripe 2a where magnetic data are recorded is formed on a rear face of the card 2. Further, the card 2 is incorporated with an IC chip (not shown) and a front face of the card 2 is formed with external connection terminals 2b of the IC chip. The card 2 in this embodiment is a card in conformity with the international standard or JIS standard and the magnetic stripe 2a is formed along a longitudinal direction of the card 2 which is formed in a substantially rectangular shape. Further, the external connection terminals 2b are formed at one end 2c side in the longitudinal direction of the card 2. The card 2 is inserted into the card reader 1 from one end 2c side in the longitudinal direction of the card 2 in a state that a front face of the card 2 is directed to an upper side and the longitudinal direction of the card 2 is substantially coincided with the front and rear direction.

As shown in FIG. 3, a portion on the front end side of the card reader 1 is formed with a cut-out part 13 which is cut out so that a card 2 is capable of being inserted and drawn out by a user. Specifically, the cut-out part 13 whose shape when viewed in the upper and lower direction is a substantially "U"-shape is formed so as to be cut out from a front end of the frame 4 toward a rear side. Further, the cut-out part 13 is formed at a middle position in the right and left direction of the frame 4 and a right side protruded part 14 and a left side protruded part 15 are formed on both sides of the cut-out part 13 in the right and left direction.

The card passage 3 is, as shown in FIG. 4, formed in a straight shape when viewed in the right and left direction (corresponding to a width direction of a card). A front end of the card passage 3 is formed with an insertion port 16 into which a card 2 is inserted. In other words, the insertion port 16 is formed at a front end of the right side protruded part 14 and a front end of the left side protruded part 15. A rear end side portion of the cut-out part 13, the right side protruded part 14 and the left side protruded part 15 are covered by a front face cover 17. A slit-shaped passage port for inserting a card 2 is formed on the front end side of the front face cover 17.

A magnetic head 7 is disposed in the vicinity of the insertion port 16. Specifically, the magnetic head 7 is disposed in a front end portion of the right side protruded part 14. In other words, the magnetic head 7 is disposed in a front side portion of the card reader 1. Further, the magnetic head 7 is disposed so that a gap of the magnetic head 7 faces the card passage 3 from a lower side, and the gap of the magnetic head 7 is structured to abut with a magnetic stripe 2a of a card 2 passing the card passage 3.

The magnetic head 7 is fixed to a plate spring 18 and is urged to an upper side by an urging force of the plate spring 18. Further, the plate spring 18 is supported by support pins (not shown) fixed to the frame 4 and the magnetic head 7 is capable of swinging together with the plate spring 18 with the front and rear direction as an axial direction of swinging. The plate spring 18 and the support pins are disposed in the front side portion of the card reader 1 and are disposed to a lower side of the card passage 3.

The IC contact block 6 is disposed in a rear side portion of the card reader 1. Specifically, the IC contact block 6 is disposed in a rear end side portion of the card reader 1. Further, the IC contact block 6 is disposed so that the IC contact springs 5 face the card passage 3 from an upper side and the IC contact block 6 is disposed on an upper side of the card passage 3. As shown in FIG. 4, a rear end of the IC contact block 6 is formed with a card engaging part 6a with which a tip end (rear end) of a card 2 is engaged.

The IC contact block 6 is connected with an upper end side portion of the frame 4 through a parallel link mechanism 20 and moves up and down while sliding in the front and rear direction. Specifically, the parallel link mechanism 20 is, as shown in FIG. 3, structured so that a pair of turning arms 20a turnably provided so as to interpose the IC contact block 6 from both sides is provided at two positions in the front and rear direction (card passing direction) so as to be parallel to each other. The respective turning arms 20a are turnably supported by a support shaft 20b which is attached to an upper end side portion of the frame 4. The IC contact block 6 is moved downward when it is moved to a rear side and is moved upward when it is moved to a front side. Further, the IC contact block 6 is urged to a front side by a tension coil spring (urging member) 21. The parallel link mechanism 20 and the tension coil spring 21 are disposed in a rear end side portion of the card reader 1 and are disposed to an upper side of the card passage 3. In accordance with an embodiment of the present invention, it may be structured that a part of the IC contact block 6 is engaged with a guide groove formed in the frame 4 and the IC contact block 6 is guided by the guide groove to be moved up and down while sliding in the front and rear direction.

In this embodiment, when a tip end of a card 2 inserted to a rear side of the card reader 1 is engaged with the card engaging part 6a of the IC contact block 6, the IC contact block 6 is moved downward and slid to a rear side while maintaining a parallel state to the card passage 3, and a plurality of the IC contact springs 5 is contacted with the external connection terminals 2b of the card 2. On the other hand, when the card 2 inserted to the rear side is pulled out to the front side, the IC contact block 6 is moved upward while sliding to the front side by an urging force of the tension coil spring 21 so that the IC contact springs 5 are separated from the front face of the card 2. In this embodiment, as described below, the card passage 3 is inclined by an angle "θ" with respect to an attaching reference face 11c provided in a fixed frame 11. Therefore, a straight line connecting center positions (axial centers) of the support shafts 20b provided at two positions in the front and rear direction (card passing direction) for turnably supporting the turning arms 20a structuring the parallel link mechanism 20 is inclined by the substantially same angle as the angle "θ" of the card passage 3 inclined with respect to the attaching reference face 11c when viewed in the right and left direction.

The lever member 8 is turnable between a close position closing the card passage 3 and an open position opening the card passage 3. The lever member 8 prevents drawing-out of the inserted card 2 at the close position. Specifically, the lever member 8 prevents drawing-out of the card 2 while the external connection terminals 2b of the card 2 and the IC contact springs 5 are contacted with each other and reading and recording of data are performed. Further, the card reader 1 includes, as shown in FIG. 3, a torsion coil spring 22 which urges the lever member 8 to the close position, a restriction pin 23 which restricts turning of the lever member 8 at the close position, and a solenoid 24 structured to move the restriction pin 23 between a turning restricted position where turning of the lever member 8 is restricted and a turnable position where the lever member 8 is capable of being turned.

In this embodiment, when a card 2 is not inserted into the insertion port 16, the lever member 8 closes the front end side of the card passage 3. In this state, when a card 2 is inserted, a tip end of the card 2 is abutted with an inclined face on the front end side of the lever member 8 which closes the front end side of the card passage 3 and the lever member 8 is turned against an urging force of the torsion coil spring 22 to open the card passage 3. After that, when the card 2 is further inserted to the rear side, the lever member 8 is turned by an urging force of the torsion coil spring 22 and the front end side of the card passage 3 is closed.

The circuit boards 9 and 10 are rigid circuit boards and are formed in a substantially rectangular flat plate shape. The circuit board 9 is larger than the circuit board 10. The circuit board 9 is fixed to an upper face side of the frame 4 so as to cover a substantially entire portion of the frame 4 from an upper side on a rear side relative to the front face cover 17. The circuit board 10 is fixed to an under face side of the frame 4 so as to cover a part of an under face of the frame 4. In this embodiment, a plurality of engaging pawls 4a which are elastically deformable in the right and left direction is formed on an upper face side of the frame 4, and the circuit board 9 is fixed to the frame 4 which is formed with the card passage 3 in its inside by engaging the engaging pawls 4a with engaging holes formed in the circuit board 9 or with an end face of the circuit board 9. In other words, the circuit board 9 is fixed to the frame 4 in a snap fit structure. Further, the circuit board 10 is a SIM circuit board on which an SIM (Subscriber Identity Module) is mounted. On the other hand, the circuit board 9 is a main circuit board on which a control circuit and the like for the card reader 1 are mounted.

The fixed frame 11 is formed of a metal thin plate which is bent in a predetermined shape and the fixed frame 11 is fixed to the frame 4. The fixed frame 11 is structured of an upper face part 11a, which covers an upper face of a front side portion of the circuit board 9 on an upper side of the frame 4, and two side face parts 11b which cover right and left side faces of the frame 4. The upper face part 11a is a flat plate part formed in a flat plate shape which is perpendicular to the upper and lower direction that is a thickness direction of a card. In other words, the upper face part 11a is parallel to an "X-Y" plane which is structured of the front and rear direction ("X" direction) and the right and left direction ("Y" direction). An upper face of the upper face part 11a is an attaching reference face 11c which is a reference surface for attaching the card reader 1 to a host device on which the card reader 1 is mounted. Therefore, the circuit board 9 that is a main circuit board on which a control circuit and the like for the card reader 1 are mounted is disposed between the upper face part 11a which is the attaching reference face 11c and the card passage 3 formed in the inside of the frame 4. In order to reduce the thickness of the card reader 1, the circuit board 9 is disposed so as to be parallel to the attaching reference face 11c. Therefore, the circuit board 9 is inclined by the substantially same angle with respect to the card passage 3 as the angle by which the card passage 3 is inclined with respect to the attaching reference face 11c. Accordingly, even when a large circuit board 9 is disposed, the circuit board 9 is not protruded to an upper face side and the card reader 1 can be made thin. The side face parts 11b are formed in a flat plate shape which is perpendicular to the right and left direction. The side face part 11b is formed with screw holes 11d for fixing the card reader 1 to the host device. The screw hole 11d is formed so as to penetrate through the side face part 11b in the right and left direction. The side face part 11b in this embodiment is an orthogonal flat part which is perpendicular to a width direction of a card 2.

As described above, the card passage 3 is formed in a straight shape when viewed in the right and left direction. In this embodiment, the card passage 3 is, as shown in FIG. 4, inclined to a lower side with respect to the attaching reference face 11c as going to a rear side when viewed in the right and left direction. In other words, the card passage 3 is inclined so as to go downward at an angle "θ" with respect to the front and rear direction (an upper face of the upper face part 11a, in other words, a forming direction of the attaching reference face 11c) as going to a rear side when viewed in the right and left direction. In FIG. 4, the angle "θ" is shown as an angle between an under face of the frame 4 parallel to the attaching reference face 11c and the card passage 3 (an angle between a line parallel to the attaching reference face 11c and the center line of the card passage 3). For example, the angle "θ" is 4°. Further, as described above, the card reader 1 is formed in a flat and substantially rectangular parallelepiped shape whose thickness in the upper and lower direction is thin. Therefore, a lower portion of the card reader 1 relative to the card passage 3 becomes gradually larger to a lower side as going to the front side and an upper portion of the card reader 1 relative to the card passage 3 becomes gradually larger to an upper side as going to the rear side.

Principal Effects in this Embodiment

As described above, in this embodiment, the magnetic head 7 is disposed in a front side portion of the card reader 1 so that a gap of the magnetic head 7 faces the card passage 3 from a lower side. Further, in this embodiment, the IC contact block 6 is disposed in a rear side portion of the card reader 1 so that the IC contact springs 5 face the card passage 3 from an upper side. Further, in this embodiment, the card passage 3 is inclined to a lower side with respect to the attaching reference face 11c as going to a rear side when viewed in the right and left direction. Therefore, a lower side portion of the card reader 1 relative to the card passage 3 becomes gradually larger to a lower side as going to the front side, and an upper side portion of the card reader 1 relative to the card passage 3 becomes gradually larger to an upper side as going to the rear side.

Therefore, in this embodiment, even when the card reader 1 is made thinner, a front side portion of the card reader 1 where the magnetic head 7, the plate spring 18 and the like are disposed can be made thicker to a lower side of the card passage 3, and a rear side portion of the card reader 1 where the IC contact block 6, the parallel link mechanism 20 and the like are disposed can be made thicker to an upper side of the card passage 3. Accordingly, in this embodiment, even when the card reader 1 is made thinner, the IC contact block 6, the magnetic head 7, the plate spring 18, the parallel link mechanism 20 and the like having been conventionally used are capable of being disposed. As a result, in this embodiment, while similarly securing reliability of the conventional card reader 1, the card reader 1 can be made further thinner than the conventional one. Further, in this embodiment, even when the card reader 1 is made thinner, the IC contact block 6, the magnetic head 7, the plate spring 18, the parallel link mechanism 20 and the like having been conventionally used are capable of being disposed and thus man-hours for designing the card reader 1 in order to make the card reader 1 thinner can be reduced.

In this embodiment, the screw hole 11d for fixing the card reader 1 to a host device is formed in the side face part 11b of the fixed frame 11 which is formed in a flat plate shape perpendicular to the right and left direction. Further, in this embodiment, two side face parts 11b are disposed so as to cover the right and left side faces of the frame 4. Therefore, according to this embodiment, even when the card reader 1 is structured to be capable of being mounted on a host device, the card reader 1 can be made thinner.

Other Embodiments

Although the present invention has been shown and described with reference to a specific embodiment, various changes and modifications will be apparent to those skilled in the art from the teachings herein.

In the embodiment described above, the screw hole 11d for fixing the card reader 1 to a host device is formed in the side face part 11b of the fixed frame 11. However, the present invention is not limited to this embodiment. For example, a through-hole through which a screw for fixing the card reader 1 to a host device is passed may be formed in the frame 4. Further, in the embodiment described above, the card 2 is a card made of vinyl chloride whose thickness is about 0.7-0.8 mm. However, the card 2 may be a PET (polyethylene terephthalate) card whose thickness is about 0.18-0.36 mm or may be a paper card having a predetermined thickness. Further, in the embodiment described above, the card reader 1 is a manual type card reader. However, the card reader to which the present invention is applied may be a card conveyance type card reader having a conveying mechanism for a card 2.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader structured to perform at least one of reading of data recorded in a card and recording of data to the card, the card having a magnetic stripe formed on a first face of the card and an IC chip formed on a second face of the card, the card reader comprising:
   a card passage where the card is passed;
   a magnetic head structured to abut with the magnetic stripe formed on the card; and
   an IC contact block having a plurality of IC contact springs structured to contact with external connection terminals of the IC chip formed on the card;
   wherein, when a side of the card reader where an insertion port for the card is formed is referred to as a front side and its opposite side is referred to as a rear side, and one side in a thickness direction of the card passing the card passage is referred to as a first direction side and its opposite side is referred to as a second direction side, the magnetic head is disposed in a front side portion of the card reader so that a gap of the magnetic head faces the card passage from the first direction side, and the IC contact block is disposed in a rear side portion of the card reader so that the IC contact springs face the card passage from the second direction side; and
   wherein a portion on the first direction side of the card reader relative to the card passage becomes gradually larger to the first direction side as going to the front side and a portion on the second direction side of the card reader relative to the card passage becomes gradually larger to the second direction side as going to the rear side.

2. The card reader according to claim 1, further comprising an attaching reference face which is a reference surface for attaching the card reader to a host device on which the card reader is to be mounted,
   wherein when viewed in a width direction of the card passing the card passage, the card passage is inclined to the first direction side with respect to the attaching reference face as going to the rear side.

3. The card reader according to claim 2, wherein
   the attaching reference face is structured of a fixed frame which is made of a metal thin plate,
   the fixed frame is provided with an orthogonal flat part in a flat plate shape which is perpendicular to the width direction of the card passing the card passage, and
   the orthogonal flat part is formed with a screw hole for fixing the card reader to the host device.

4. The card reader according to claim 3, further comprising a frame which is formed with the card passage in its inside,
   wherein the fixed frame is provided with a flat plate part having the attaching reference face on one side in the thickness direction of the card passing the card passage and two orthogonal flat parts on both sides of the flat plate part,
   wherein a circuit board on which a control circuit for the card reader is mounted is provided between the frame and the flat plate part of the fixed frame, and
   wherein the card passage is inclined by the substantially same angle with respect to the circuit board as an angle of inclination of the card passage with respect to the attaching reference face.

5. The card reader according to claim 4, wherein
the IC contact block is connected with the frame through a parallel link mechanism,
the parallel link mechanism comprises turning arms which are parallel to each other and are turnably supported by a support shaft at two positions in a card passing direction when viewed in the width direction of the card passing the card passage, and
a straight line connecting two support shafts provided in the card passing direction is inclined by the substantially same angle with respect to the attaching reference face as the angle of inclination of the card passage with respect to the attaching reference face.

6. The card reader according to claim 1, further comprising:
a frame which is formed with the card passage in its inside; and
a circuit board which is attached to the frame and on which a control circuit for the card reader is mounted;
wherein when viewed in a width direction of the card passing the card passage, the card passage is inclined to the first direction side with respect to the circuit board as going to a rear side,
wherein the IC contact block is connected with the frame through a parallel link mechanism,
wherein the parallel link mechanism comprises turning arms which are parallel to each other and are turnably supported by a support shaft at two positions in a card passing direction when viewed in the width direction of the card passing the card passage, and
wherein a straight line connecting two support shafts provided in the card passing direction is inclined by the substantially same angle with respect to the circuit board as the angle of inclination of the card passage with respect to the circuit board.

7. The card reader according to claim 6, wherein
the first direction side is an opposite side to the circuit board with respect to the card passage, and
the second direction side is a side of the circuit board with respect to the card passage.

8. A card reader structured to perform at least one of reading of data recorded in a card and recording of data to the card, the card having a magnetic stripe formed on a first face of the card and an IC chip formed on a second face of the card, the card reader comprising:
a card passage where the card is passed;
an attaching reference face which is a reference surface for attaching the card reader to a host device on which the card reader is to be mounted;
a magnetic head structured to abut with the magnetic stripe formed on the card; and
an IC contact block having a plurality of IC contact springs structured to contact with external connection terminals of the IC chip formed on the card;
wherein when a side of the card reader where an insertion port for the card is formed is referred to as a front side and its opposite side is referred to as a rear side, and one side in a thickness direction of the card passing the card passage is referred to as a first direction side and its opposite side is referred to as a second direction side, the magnetic head is disposed in a front side portion of the card reader so that a gap of the magnetic head faces the card passage from the first direction side, and the IC contact block is disposed in a rear side portion of the card reader so that the IC contact springs face the card passage from the second direction side; and
wherein when viewed in a width direction of the card passing the card passage, the card passage is inclined to the first direction side with respect to the attaching reference face as going to the rear side.

9. The card reader according to claim 8, further comprising a fixed frame made of a metal thin plate for fixing the card reader to the host device,
wherein the fixed frame is provided with an orthogonal flat part in a flat plate shape which is perpendicular to the width direction of the card passing the card passage, and
wherein the orthogonal flat part is formed with a screw hole for fixing the card reader to the host device.

10. The card reader according to claim 9, further comprising a frame which is formed with the card passage in its inside,
wherein the fixed frame is provided with a flat plate part having the attaching reference face on one side in the thickness direction of the card passing the card passage and two orthogonal flat parts on both sides of the flat plate part,
wherein a circuit board on which a control circuit of the card reader is mounted is provided between the frame and the flat plate part of the fixed frame, and
wherein the card passage is inclined by the substantially same angle with respect to the circuit board as an angle of inclination of the card passage with respect to the attaching reference face.

11. The card reader according to claim 8, wherein
the IC contact block is connected with the frame through a parallel link mechanism,
the parallel link mechanism comprises turning arms which are parallel to each other and are turnably supported by a support shaft at two positions in a card passing direction when viewed in the width direction of the card passing the card passage, and
a straight line connecting two support shafts provided in the card passing direction is inclined by the substantially same angle with respect to the attaching reference face as the angle of inclination of the card passage with respect to the attaching reference face.

12. The card reader according to claim 8, wherein
the first direction side is an opposite side to the attaching reference face with respect to the card passage, and
the second direction side is a side of the attaching reference face with respect to the card passage.

* * * * *